US006422734B1

(12) United States Patent
Sethuraman et al.

(10) Patent No.: US 6,422,734 B1
(45) Date of Patent: Jul. 23, 2002

(54) STATIC FOAM GENERATING APPARATUS AND METHOD

(75) Inventors: Gopalakrishnan Sethuraman; Ronald S. Finkelstein, both of East Amherst; Larry W. Kingston, North Tonawanda; Robert C. Mitchell, Youngstown; W. Roy Burke, Tonawanda, all of NY (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 09/427,982

(22) Filed: Oct. 27, 1999

(51) Int. Cl.$^7$ ............................ B01F 5/06; B01F 13/02; B01F 17/08; C04B 38/10

(52) U.S. Cl. ............... 366/101; 106/677; 261/DIG. 26; 366/340; 516/10; 516/14

(58) Field of Search ..................... 516/10, 14; 366/101, 366/340; 261/DIG. 26; 106/677

(56) References Cited

U.S. PATENT DOCUMENTS

| | | | | | |
|---|---|---|---|---|---|
| 2,639,901 | A | | 5/1953 | Teale | |
| 2,864,714 | A | | 12/1958 | Dixon, Jr. et al. | |
| 3,559,741 | A | | 2/1971 | Levy | 169/15 |
| 3,607,779 | A | | 9/1971 | King et al. | |
| 3,846,515 | A | | 11/1974 | Williamson | 261/18 B |
| 4,038,037 | A | | 7/1977 | Wilmsen | |
| 4,057,443 | A | | 11/1977 | Stiling et al. | 156/43 |
| 4,061,001 | A | | 12/1977 | von der Eltz et al. | 68/200 |
| 4,068,830 | A | * | 1/1978 | Gray | 366/340 X |
| 4,213,936 | A | | 7/1980 | Lodrick | 422/133 |
| 4,310,996 | A | | 1/1982 | Mulvey et al. | 52/809 |
| 4,441,823 | A | * | 4/1984 | Power | 366/340 X |
| 4,455,271 | A | | 6/1984 | Johnson | 264/42 |
| 4,514,095 | A | * | 4/1985 | Ehrfeld et al. | 366/340 |
| 4,523,954 | A | | 6/1985 | Pichat et al. | 106/110 |
| 4,804,688 | A | | 2/1989 | Vassileff | 521/64 |
| 5,116,671 | A | | 5/1992 | Bruce et al. | 428/309.9 |
| 5,213,120 | A | | 5/1993 | Dickson | 134/102.1 |
| 5,330,691 | A | | 7/1994 | Geeraert | 264/42 |
| 5,356,565 | A | * | 10/1994 | Southwell | 516/10 |
| 5,427,181 | A | * | 6/1995 | Laskaris et al. | 261/DIG. 26 X |
| 5,643,510 | A | | 7/1997 | Sucech | 264/40.1 |
| 5,683,635 | A | | 11/1997 | Sucech et al. | 264/42 |

FOREIGN PATENT DOCUMENTS

| | | |
|---|---|---|
| GB | 2 318 069 | 4/1998 |

OTHER PUBLICATIONS

International Search Report for application no. PCT/US00/41139, mailed Mar. 15, 2001.

* cited by examiner

*Primary Examiner*—Richard D. Lovering
(74) *Attorney, Agent, or Firm*—Howrey Simon Arnold & White, LLP

(57) ABSTRACT

A static foam generating apparatus including a pipe having an inner diameter, an axis, an input end, and an output end is disclosed. A plurality of perforated discs are disposed in the pipe, the discs positioned parallel to each other and perpendicular to the pipe axis. A plurality of spacer rings are disposed within the pipe, a spacer ring separating each perforated disc from each adjacent perforated disc. Additionally, a method for generating foam including the steps of providing a static foam generating apparatus including a pipe having an inner diameter, an axis, an input end, and an output end, supplying feed water to the pipe, supplying surfactant to the pipe, and supplying air to the pipe is disclosed.

5 Claims, 2 Drawing Sheets

STATIC FOAM GENERATING APPARATUS AND METHOD

BACKGROUND OF THE INVENTION

1. Field of the Invention

The present invention relates generally to methods and apparatus for generating foam, and in particular to methods and apparatus for generating foam for use in producing gypsum wallboards.

2. Description of Related Technology

Gypsum wallboard is typically produced by depositing an aqueous slurry of calcined gypsum between two continuously-supplied moving sheets of cover paper. The calcined gypsum is then allowed to set, forming a core between the two cover sheets, and the continuously-produced board may then be cut into panels of any desired length. As described for example in Johnson, U.S. Pat. No. 4,455,271, the disclosure of which is incorporated herein by reference, a gypsum board with reduced density and good board strength is typically manufactured by generating an aqueous foam in a foam generating apparatus and adding the foam to the gypsum slurry that forms the gypsum board core.

Foams for use in producing gypsum boards are typically generated in a mechanical foam generating apparatus, such as that described in U.S. Pat. No. 4,057,443, the disclosure of which is incorporated herein by reference. A foam generating apparatus typically includes an electric motor used to drive an agitator, which blends a surfactant and water to generate the foam. Consequently, a foam generating apparatus is typically expensive to operate and maintain, and includes mechanical components that are subject to wear and failure.

Static foam generating equipment, such as a cylindrical static mixer described in Johnson, U.S. Pat. No. 4,455,271 has also been used to generate foam for use in a gypsum wallboard core. The static mixer described in the Johnson patent is a six-foot-long tube packed with randomly arranged ceramic saddles in a five-foot portion of the tube and ceramic rings packed in a one-foot portion of the tube. There is a need for an improved apparatus for generating foam that is inexpensive and reliable to operate, and that consistently produces a uniform, high quality foam, which may be used to produce high quality gypsum wallboard.

SUMMARY OF THE INVENTION

According to one aspect of the present invention, a static foam generating apparatus includes a pipe having an inner diameter, an axis, an input end, and an output end. A plurality of perforated discs are disposed in the pipe, the discs positioned parallel to each other and perpendicular to the pipe axis. A plurality of spacer rings are disposed within the pipe, a spacer ring separating each perforated disc from each adjacent perforated disc.

According to another aspect of the present invention, a method for generating foam includes a step of providing a static foam generating apparatus including a pipe having an inner diameter, an axis, an input end, and an output end. The apparatus also includes a plurality of perforated discs disposed in the pipe, the discs positioned parallel to each other and perpendicular to the pipe axis. A plurality of spacer rings are disposed within the pipe, a spacer ring separating each perforated disc from each adjacent perforated disc. The method also includes the steps supplying feed water to the pipe, supplying surfactant to the pipe, and supplying air to the pipe.

DETAILED DESCRIPTION OF PREFERRED EMBODIMENTS

Figure 1:
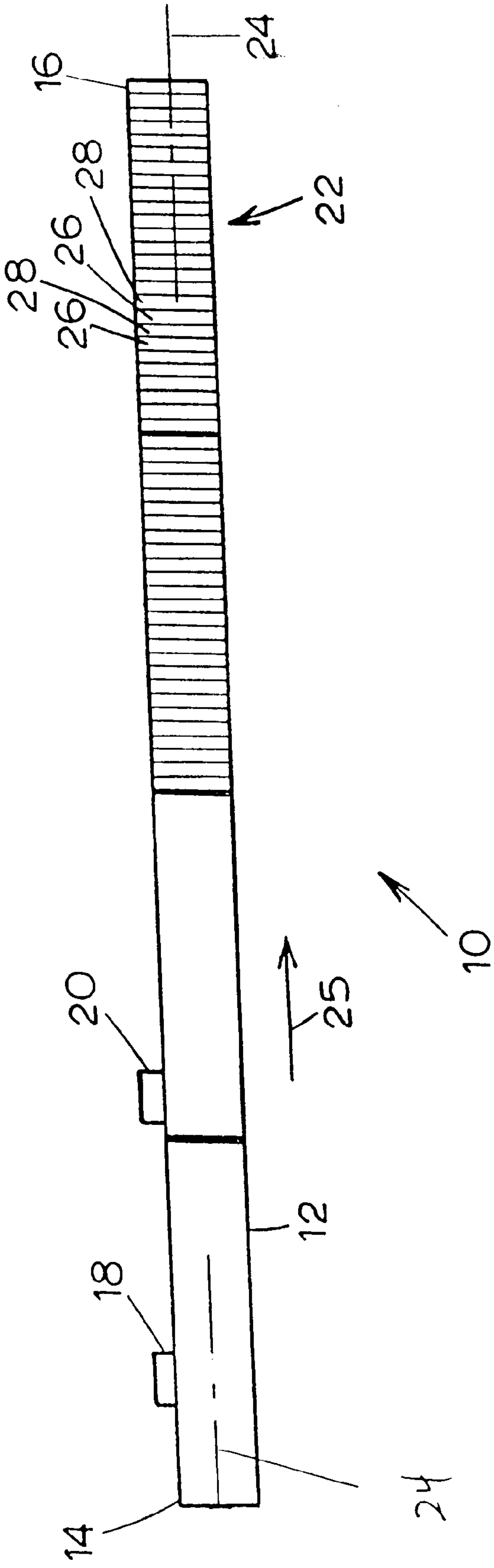
FIG. 1 is a schematic view of a static foam generating apparatus of the present invention.

As shown in FIG. 1, a static foam generating apparatus 10 includes a pipe 12 having an input end 14 at which feed water is supplied and an output end 16. The output end 16 may be connected to a gypsum pin mixer apparatus (not shown). The pipe 12 includes a surfactant inlet 18, an air inlet 20, and a mixing region 22, a representative portion of which is shown in more detail in FIG. 2. The pipe 12 has an axis 24, and an inner diameter that typically is about 1 inch to about 3 inches (about 2.5 cm to about 7.6 cm). Pipe 12 can be, for example, a 1.95-inch-inner-diameter (about 5.0-cm-inner-diameter) schedule-80 PVC (polyvinyl chloride) pipe. Water, surfactant, and air flow through the apparatus 10 in the direction indicated by an arrow 25 in FIG. 1.

Figure 2:
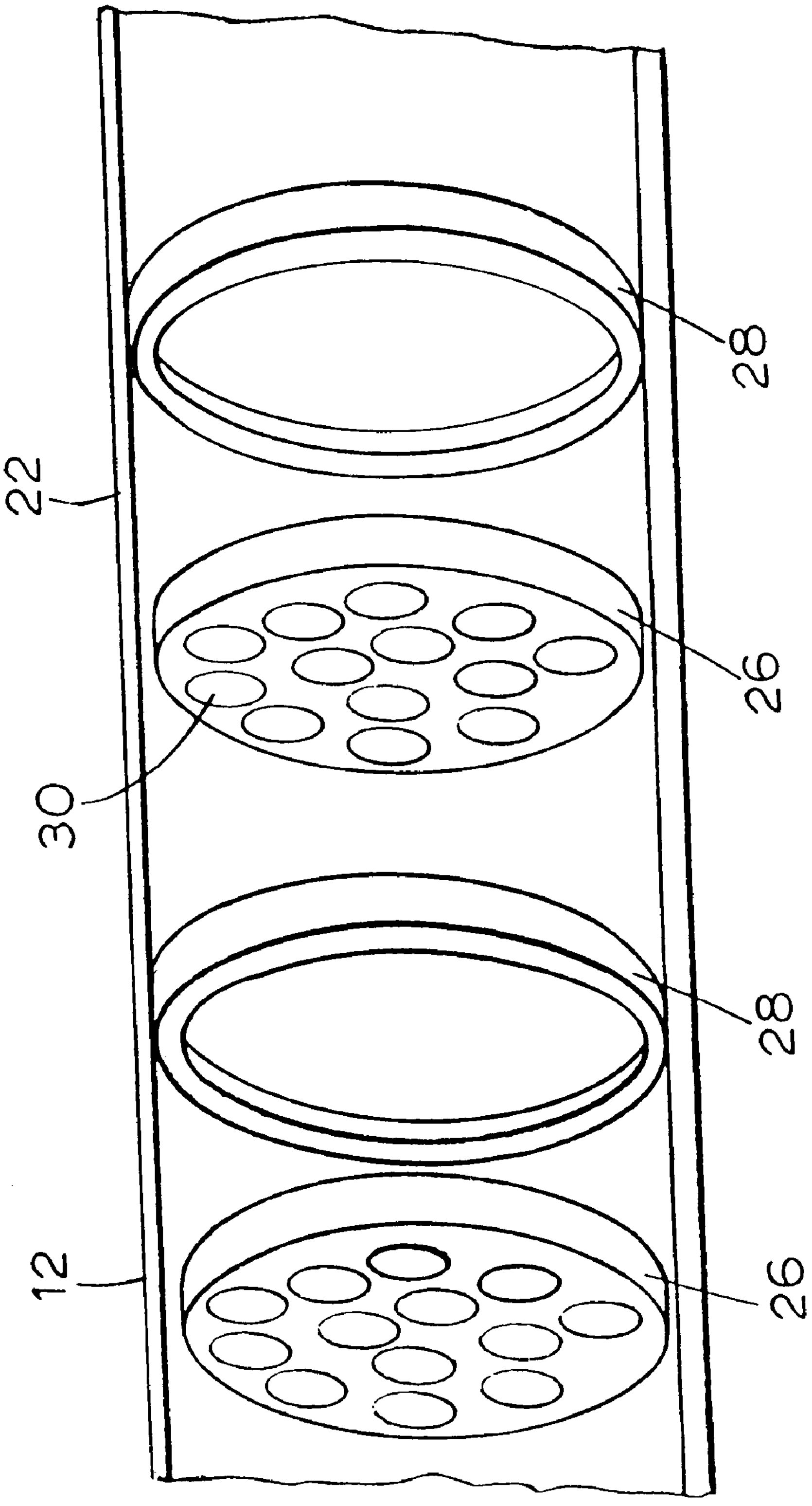
FIG. 2 is an exploded view of a portion of the foam generating apparatus of FIG. 1.

The mixing region 22 of the pipe 12 includes a plurality of perforated disks 26 separated by spacer rings 28, as shown in FIGS. 1 and 2. The perforated disks 26 and spacers 28 are sized to fit tightly inside of the pipe 12, preferably having an outer diameter that is slightly less than the inner diameter of the pipe 12. The entire mixing region 22 preferably is packed with disks 26 and spacers 28, packed closely together in an alternating arrangement, oriented parallel to each other and perpendicular to the axis 24 of the pipe 12. Preferably, each adjacent disk 26 and spacer 28 are in contact with each other. The mixing region typically has a length from about 2 feet to about 10 feet (about 0.61 m to about 3.0 m), and preferably has a length of about 5 feet (about 1.5 m). Preferably, each perforated disk 26 has a thickness of about 0.10" to about 0.30" (about 0.25 cm to about 0.76 cm), and each spacer 28 has a thickness of about ¼" to about 1 ¼" (about 0.64 cm to about 3.2 cm). Each perforated disk 26 preferably has a plurality of perforations 30, each having a diameter of about ⅛" to about ¾" (about 0.32 cm to about 1.9 cm). Preferably, the perforations 30 are uniformly spaced on the discs 26, and adjacent discs 26 are oriented so that the perforations 30 in each disc 26 are generally staggered in position with respect to the perforations 30 in adjacent discs 26. In one embodiment, the pipe 12 has an inner diameter of about 1.95" (about 5.0 cm), the perforated disks 26 have a thickness of about 0.1875" (about 0.48 cm) and an outer diameter of about 1.91" (about 4.9 cm), the perforations have a diameter of about ½" (about 1.3 cm), each disk 26 includes about 8 perforations, and the spacers 28 have a thickness of about ¾" (about 1.9 cm) and an outer diameter of about 1.9" (about 4.8 cm). The perforated disks 26 and spacers 28 may be made from any rigid material, such as PVC. Although the pipe and perforations shown in FIGS. 1 and 2 have circular cross-sections, it is understood that the cross-sections can have other shapes, such as an oval cross section.

According to a preferred method of producing foam for use in a gypsum pin mixer, feed water is supplied to the input end 14 of the pipe 12 at a rate of about 300 lbs water per thousand square feet of gypsum board (300 lbs/MSF) to about 400 lbs/MSF (about 1465 kg/1000 $m^2$ to about 1950 kg/1000 $m^2$). For a gypsum board line running at a rate of about 162 ft/min (about 82.3 cm/sec), the flow rate of water is typically between about 20 gal/min to about 40 gal/min (about 75.7 L/min to about 151 L/min). Surfactant is supplied to the surfactant inlet 18, downstream of the input end 14, typically at a rate of about 0.4 lbs/MSF to about 1.0 lbs/MSF (about 2.0 kg/1000 $m^2$ to about 4.9 kg/1000 $m^2$). The surfactant can be, for example, a $C_8$–$C_{12}$ anionic or nonionic surfactant, or an ammonium salt of an ethoxylated alcohol sulfate. As known to those skilled in the art, such surfactants typically include about 40% to about 50% by weight active ingredients, with the balance including solvents (e.g., isopropyl alcohol) and other ingredients. Air is supplied to the apparatus 10 at the air inlet 20, downstream of the surfactant inlet 18, typically at a rate of about 10 cubic feet per minute (CFM) to about 16 CFM (about 4.7 L/sec to about 7.5 L/sec).

Foam produced by the apparatus 10 is discharged from the apparatus 10 at the output end 16, and the foam can be inserted into or combined with a gypsum slurry in a gypsum pin mixer by apparatus and methods known to those skilled in the art. As shown in Examples 1 and 2 below, the gypsum boards produced with foam generated by the apparatus 10 have board strengths similar to, or greater than, those produced with prior foam-generating equipment typically used with gypsum pin mixers. The apparatus 10 is less expensive to operate and maintain than a typical prior mechanical foam generating apparatus, because the apparatus 10 does not include any motor-driven agitator.

EXAMPLE 1

Foam was generated using a static foam generating apparatus and inserted into a pin mixer for use in gypsum boards including the following ingredients, under the following conditions:

- board line speed: 162 ft/min (82.3 cm/sec)
- board weight: 1750 lbs/MSF (8544 kg/1000 $m^2$)
- stucco: 900 lbs/MSF (4394 kg/1000 $m^2$)
- foam water: 380 lbs/MSF (29.6 gal/min) (1855 kg/l000 $m^2$) (112 L/min)
- surfactant: 0.81 lbs/MSF (4.0 kg/1000 $m^2$)
- surfactant type: Surfactant TF Foamer (ammonium salt of ethoxylated alcohol sulfate), supplied by Thatcher Company, Salt Lake City, Utah.
- pulp water: 227 lbs/MSF (1108 kg/1000 $m^2$) (supplied to gypsum pin mixer)
- foam air: approx. 12.8 CFM (6.0 L/sec)
- pipe used: PVC schedule 80
- mixing region length: 5 ft (1.5 m)
- perforated disks: 0.1875" thick (0.476 cm)
- perforations: ½" diameter (1.27 cm)
- spacers: ¾" wide (1.9 cm) PVC Gypsum boards having a thickness of about ½" and a width of about 4 ft were produced, and two randomly-selected boards were tested for strength by the Nail Pull Resistance Test Method B (ASTM Method C 473-99, section 13) and for compressive strength using an Instron 4486 instrument (supplied by the Instron Company of Canton, Mass.). Each tested board was tested at several locations on the board. The following results were obtained:

Nail Pull Test

| Test No. | Board No. 1 (lbs F) | Board No. 1 (N) | Board No. 2 (lbs F) | Board No. 2 (N) |
|---|---|---|---|---|
| 1 | 65.2 | 290 | 74.62 | 332 |
| 2 | 65.35 | 291 | 61.14 | 272 |
| 3 | 67.77 | 301 | 74.1 | 330 |
| 4 | 58.3 | 259 | 63.14 | 281 |
| 5 | 65.42 | 291 | 66.43 | 296 |
| 6 | 67.69 | 301 | 70.95 | 316 |
| 7 | 74.6 | 332 | 65.22 | 290 |
| 8 | 71.49 | 318 | 69.67 | 310 |
| 9 | 72.01 | 320 | 68.29 | 304 |
| 10 | 68.75 | 306 | N/A | |
| Average (of 6 highest values) | 70 (±3) | 311 (±13) | 70 (±3) | 311 (±13) |

Compressive Strength

| Test No. | Board No. 1 (psi) | Board No. 1 (kg/cm²) | Board No. 2 (psi) | Board No. 2 (kg/cm²) |
|---|---|---|---|---|
| 1 | 335.6 | 23.6 | 381 | 26.8 |
| 2 | 398.2 | 28.0 | 323 | 22.7 |
| 3 | 337.7 | 23.7 | 329.9 | 23.2 |
| 4 | 339.3 | 23.9 | 344.6 | 24.2 |
| 5 | 350.1 | 24.6 | 350.6 | 24.7 |
| 6 | 351.0 | 24.7 | 351.0 | 24.7 |
| 7 | 350.1 | 24.6 | 362.4 | 25.5 |
| 8 | 354.6 | 24.9 | 366.3 | 25.8 |
| 9 | 356.1 | 25.0 | 381.0 | 26.8 |
| Average (of 6 highest values) | 360 (±14) | 25.3 (±1.0) | 359 (±14) | 25.2 (±1.0) |

EXAMPLE 2

Foam was generated using a prior mechanical foam generating apparatus, which generated foam by pumping air, water, and surfactant through two gear pumps in series, the pumps driven by a 20 H.P. electric motor, under conditions otherwise similar to those for Example 1 above. Gypsum boards having a thickness of about ½" and a width of about 4 ft were produced, and a randomly-selected board was tested for strength by the Nail Pull Resistance Test Method B (ASTM Method C 473-99, section 13) and for compressive strength using an Instron 4486 instrument (supplied by the Instron Company of Canton, Mass.). The following results were obtained:

Nail Pull Test

| Test No. | Test Results (lbs F) | Test Results (N) |
|---|---|---|
| 1 | 60 | 267 |
| 2 | 61 | 271 |
| 3 | 66 | 294 |
| 4 | 63 | 280 |
| 5 | 57 | 254 |
| 6 | 66.1 | 294 |
| 7 | 67 | 298 |

-continued

Nail Pull Test

| Test No. | Test Results (lbs F) | (N) |
|---|---|---|
| 8 | 69.12 | 307 |
| 9 | 67 | 298 |
| 10 | 69.14 | 308 |
| Average (of 6 highest values) | 67 (±2) | 298 (±9) |

Compressive Strength

| Test No. | Test Results (psi) | ($kg/cm^2$) |
|---|---|---|
| 1 | 285.4 | 20.1 |
| 2 | 286.3 | 20.1 |
| 3 | 337.6 | 23.7 |
| 4 | 316.1 | 22.2 |
| 5 | 286.9 | 20.2 |
| 6 | 295.1 | 20.7 |
| 7 | 296.3 | 20.8 |
| 8 | 305.4 | 21.5 |
| 9 | 307.1 | 21.6 |
| Average (of highest values) | 310 (±16) | 21.8 (±1.1) |

As shown by the test results reported in Example 1 and Example 2, gypsum boards produced with foam generated by the static foam generating apparatus have board strengths that are similar to, or greater than, the strengths of boards produced under similar conditions except including foam produced with prior foam-generating equipment typically used with pin mixers. The foregoing detailed description is given for clearness of understanding only, and no unnecessary limitations should be understood therefrom, as modifications within the scope of the invention will be apparent to those skilled in the art.

What is claimed is:

1. A static foam generating apparatus comprising:

a pope having an inner diameter of about 1 inch to about 3 inches (about 2.5 cm to about 7.6 cm), an axis, an input end, and an output end;

a plurality of perforated discs disposed in the pipe axis; and a plurality of spacer rings disposed in the pipe, a spacer ring separating each perforated disc from each adjacent perforated disc.

2. The apparatus of claim 1, wherein the pipe has an inner diameter of about 2 inches (about 5.1 cm).

3. A static foam generating apparatus comprising:

a pipe having an inner diameter, an axis, an input end, and an output end;

a plurality of perforated discs disposed in the pipe, the discs positioned parallel to each other and perpendicular to the pipe axis, wherein each disc has a thickness of about 0.19 inches (about 0.48 cm); and a plurality of spacer rings disposed in the pipe, a spacer ring separating each perforated disc from each adjacent perforated disc.

4. A static foam generating apparatus comprising:

a pipe having an inner diameter, an axis, an input end, and an output end;

a plurality of perforated discs disposed in the pipe, the discs positioned parallel to each other and perpendicular to the pipe axis; and a plurality of spacer rings disposed in the pipe, a spacer ring separating each perforated disc from each adjacent perforated disc, wherein each spacer ring has a thickness of about 0.25 inch to about 1.25 inches (about 0.64 cm to about 3.2 cm).

5. The apparatus of claim 4, wherein each spacer ring has a thickness of about 0.75 inch (about 1.9 cm).

* * * * *

UNITED STATES PATENT AND TRADEMARK OFFICE

CERTIFICATE OF CORRECTION

PATENT NO. : 6,422,734 B1
DATED : July 23, 2002
INVENTOR(S) : Sethuraman et al.

It is certified that error appears in the above-identified patent and that said Letters Patent is hereby corrected as shown below:

Column 6,
Line 5, change "pope" to -- pipe --.
Line 8, after "pipe" and before "axis" insert -- , the discs positioned parallel to each other and perpendicular to the pipe --.

Signed and Sealed this

Twenty-sixth Day of November, 2002

*Attest:*

JAMES E. ROGAN

*Attesting Officer*

*Director of the United States Patent and Trademark Office*